Patented Jan. 4, 1927.

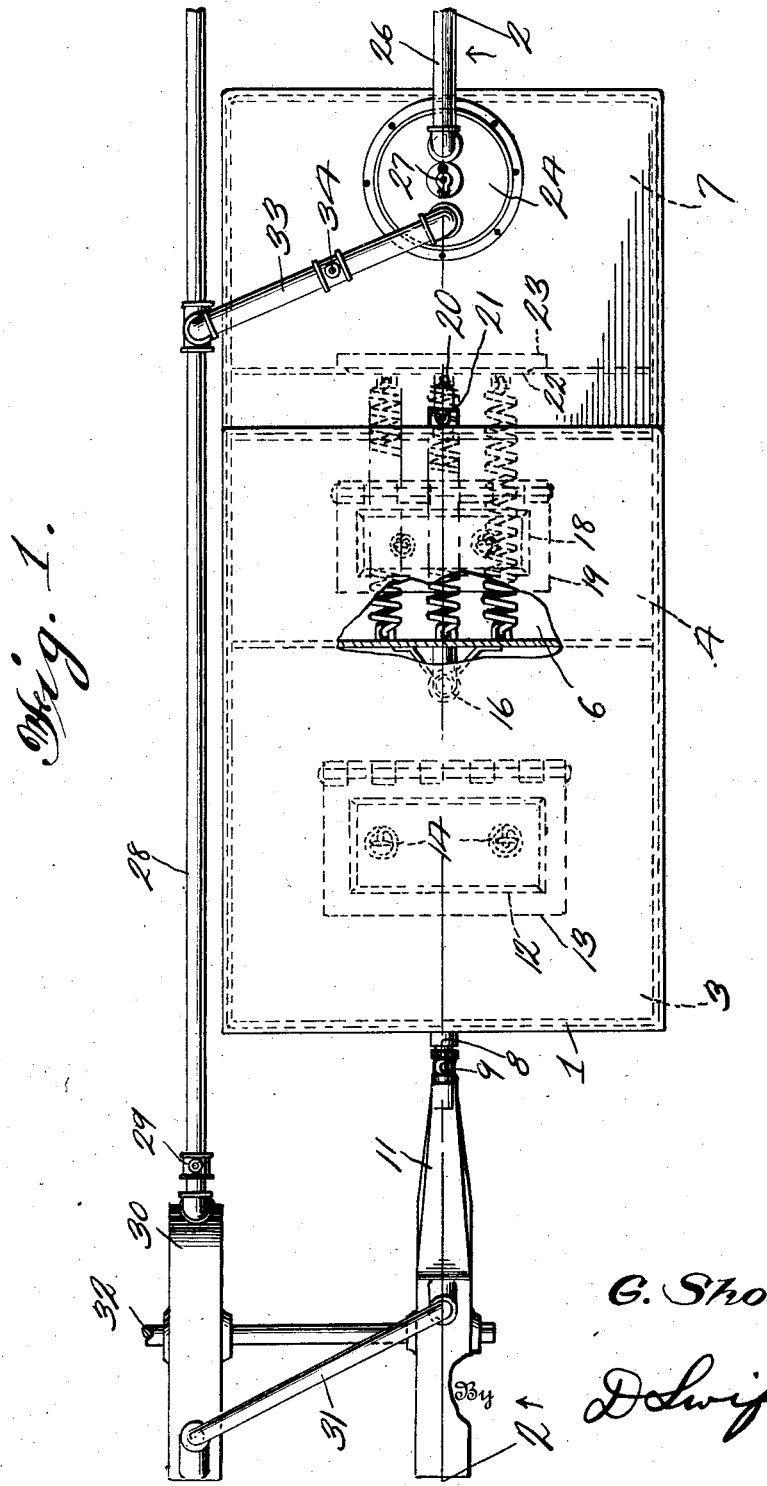

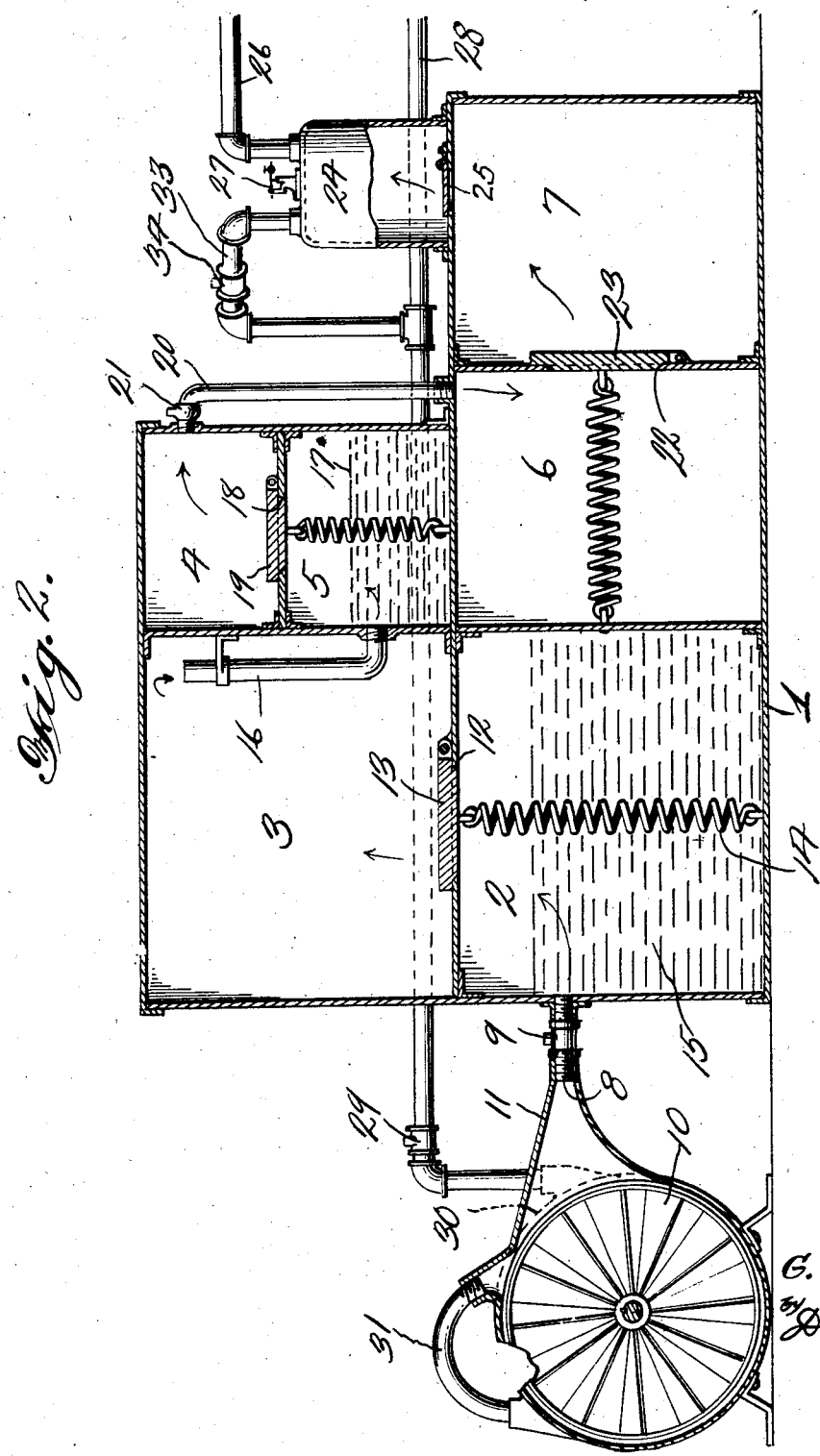

1,613,059

UNITED STATES PATENT OFFICE.

GEORGE SHOUP, OF MUSKEGON, MICHIGAN.

AIR TANK.

Application filed June 5, 1922. Serial No. 565,999.

The invention relates to air tanks for supplying air to air driven engines, and has for its object to provide a device of this character wherein air from a blower passes through water in a chamber and thence through a valve covered port to a second chamber from which second chamber the air passes through a pipe to a second water filled chamber and thence through a series of chambers to a dome, from which dome the air passes to the engine to be driven.

A further object is to provide a rotary engine for operating the blower, said rotary engine being assisted in its rotation by the exhausted air from the air driven engine.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawing:—

Figure 1 is a top plan view of the device.

Figure 2 is a vertical longitudinal sectional view through the device taken on line 2—2 of Figure 1.

Referring to the drawing, the numeral 1 designates the air tank, which tank is provided with chambers 2, 3, 4, 5, 6 and 7. Extending outwardly from one end of the air tank 1 and in communication with the chamber 2 is a pipe 8 having a check valve 9 and through which pipe air is forced by the blower fan 10, which has its casing 11 connected to the outer end of the pipe 8. The chambers 2 and 3 are in communication with each other through the opening 12 which is normally closed by a hinged valve 13. The valve 13 is held closed normally by the coiled spring 14, however when air is forced into the chamber 2, the air passes through the water 15 in said chamber where it is partially cleansed so that particles such as dust will not be passed to the engine to be driven. The air after being partially cleansed passes to the chamber 3 and thence downwardly through the pipe 16, the lower end of which is in communication with the chamber 5 below the water level 17 therein where it is again washed before it passes through the opening 18 to the chamber 4 past the hinged spring actuated valve 19.

The air passes from the chamber 4 after the second washing thereof to the pipe 20 past the check valve 21 to the chamber 6 and thence through the opening 22 which is closed by the hinged spring actuated valve 23 to the chamber 7. The air then passes through the hinged valve 25 to the dome 24, from which the air passes through a pipe 26 to an engine to be driven by the air in any suitable manner. The dome 24 is provided with a conventional form of safety valve 27 whereby the pressure may be regulated within the dome 24. The air after passing through the pipe 26 to an engine to be operated passes through an exhaust pipe 28 and through a check valve 29 carried by the pipe 28 to a conventional form of rotary engine 30, which engine is partially operated by the exhaust air, and when operated assists in rotating the fan 10. The air after assisting in operating the rotary engine 30 passes through the pipe 31 to the casing 11 of the blower and further assists in rotating the fan 10 therein. The rotary engine 30 is operated in any suitable manner by a drive shaft 32, which may lead to a motor or any other kind of an engine and the shaft 32 also rotates the fan 10, however engine 30 partially assists in driving the shaft 32. It will be noted that the air which passes through the pipe 28 after having been utilized for operating an engine to which pipes 26 and 28 are connected is again utilized for assisting in the operation of the rotary engine. Connecting the dome 24 and the pipe 28 is an emergency bypass pipe 33, by means of which when the valve 34 is opened a portion of the air within the dome 24 may be utilized for raising the pressure in the pipe line 28 when so desired.

From the above it will be seen that an air tank is provided which is simple in construction and so constructed that air will pass through a plurality of valved chambers and that the air will be doubly and thoroughly washed before it is utilized for operating an engine.

The invention having been set forth what is claimed as new and useful is:—

An air tank comprising a casing having a plurality of horizontally arranged chambers, superimposed chambers above said first mentioned chambers and separated therefrom by walls, said walls having openings therein effecting communication between the respective chambers, horizontally disposed and vertically swinging flap valves closing said openings, spring means for normally maintaining said flap valves closed, means for forcing air through liquid in one of the first mentioned chambers and past the corresponding flap valve, said last named means also forming means for forcing the air through liquid in a chamber to one side of the first mentioned liquid chamber, said horizontally disposed flap valves when open allowing flow of excess moisture into the liquid chambers.

In testimony whereof I have signed my name to this specification.

GEORGE SHOUP.